April 3, 1945. W. FENTON 2,372,891
MOUNTING DEVICE FOR WHEELS
Original Filed Sept. 22, 1937
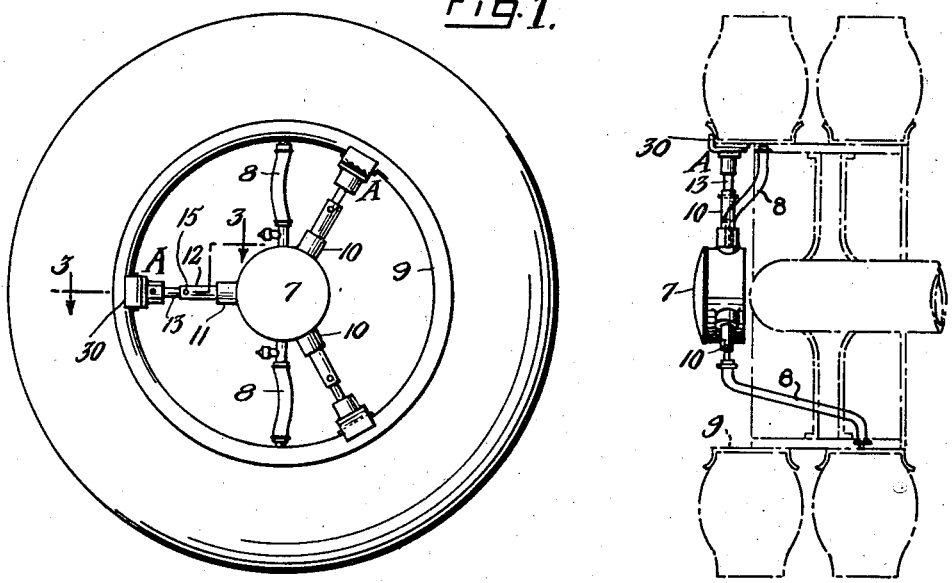
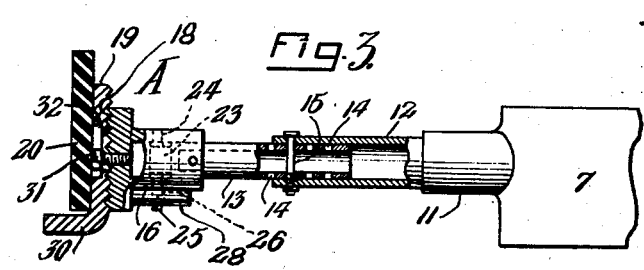
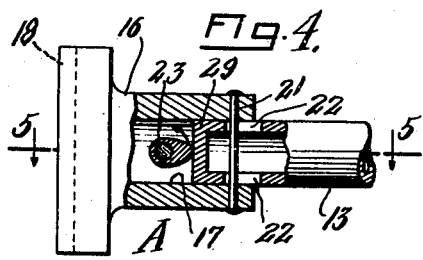
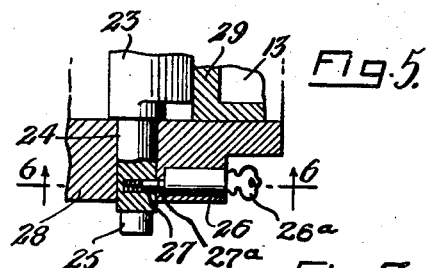
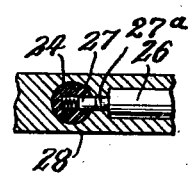
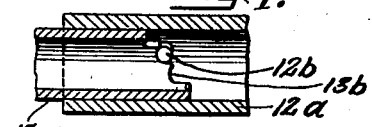
INVENTOR
Warren Fenton.
BY
ATTORNEYS Patented Apr. 3, 1945

2,372,891

UNITED STATES PATENT OFFICE 2,372,891

MOUNTING DEVICE FOR WHEELS

Warren Fenton, Philadelphia, Pa.

Substituted for abandoned application Serial No. 165,029, September 22, 1937. This application August 17, 1943, Serial No. 499,019

6 Claims. (Cl. 248—201)

My invention relates to means for mounting a casing or other device substantially centrally of a vehicle wheel.

I have illustrated my invention in connection with mounting a tire inflation alarm such as is illustrated in my Patent No. 2,056,064, granted September 29, 1936, for which purpose it is particularly useful, but it will be understood that its use is not confined to mounting such alarms.

This application is a substitute for abandoned application Serial No. 165,029, filed September 22, 1937, and allowed September 24, 1938.

It is the primary object of my invention to provide a mounting device which can be adjusted quickly and effectively to fit wheels of different sizes and engage the wheels securely.

It is another object to provide a mounting device which can be quickly applied to and removed from a wheel and can be locked to the wheel when applied.

It is a further object to provide a mounting device having means to permit radial adjustment to fit wheels of different sizes and axial adjustment to accommodate various rim conditions.

A further object is to provide a mounting device with resilient means to absorb road shocks and prevent undue shock to the device which is to be mounted.

I have illustrated my invention in the preferred form in the accompanying drawing, wherein:

Figure 1 is an elevation of a wheel showing the mounting device used to mount a tire inflation alarm;

Figure 2 is a side view of the device looking toward the left in Figure 1, the wheel and tire being diagrammatically shown in dot and dash lines;

Figure 3 is an enlarged section taken substantially on the line 3—3 of Figure 1;

Figure 4 is a fragmentary view of the end of the arm shown in Figure 3, a portion being shown in cross-section;

Figure 5 is a fragmentary section taken substantially on the line 5—5 of Figure 4;

Figure 6 is a fragmentary section taken on the line 6—6 of Figure 5; and

Figure 7 illustrates a modified arm construction.

Referring to Figure 1, reference numeral 7 indicates the casing of the tire alarm device which is connected to the tires by means of tubes 8 one of which leads to one tire and the other to the second tire.

Three arms extend radially from this casing and at the outer end each arm engages the rim 9 of the wheel.

Two of these arms 10—10 are of identical construction but the third arm 11 has some additional features not found in arms 10.

Referring to Figure 3, it will be seen that the arm 11 consists of the tubular member 12 secured to casing 7, a smaller tubular member 13 which fits and slides within tube 12 and a head or end member indicated as a whole by reference letter A.

The tubular member 12 is provided with a bolt 15 which extends through the tube. The tubular member 13 is provided with a series of holes 14 and an approximate extension of the arm to proper adjustment is secured by sliding the tube 13 in the tube 12, until the desired hole 14 registers with the holes of the bolt 15. The bolt 15 is then inserted through the aligned holes and holds the members 12 and 13 fixed in desired position. The construction of arms 10 is similar to arm 11 in this respect.

In arm 11 the head A comprises a member 16 having a tubular portion 17, a saw tooth face 18, a cooperating angle plate or lug 19, and a resilient pad 20. The tube 13 fits and slides within the tubular portion 17 of the head and is prevented from sliding out by means of the pin 21 which is mounted in the tubular portion 17 and extends through slots 22 in tube 13. There is also mounted in tubular portion 17 a cam 23 which may be keyed to a pin having bearings 24 in opposite walls of the head, one of the said bearings extending beyond the wall and terminating in a squared end 25 to which a wrench can be applied to turn the cam. One side of the head at this bearing also has a thickened wall 28 to provide room for mounting the lock 26. This lock has a spring pressed pin 27 in the bearing 24 which engages the wall 28 to prevent turning of the cam 23 when it is in the position illustrated in Figs. 5 and 6. The pin 27a, which engages the end of the pin 27, is moved in and out of the lock 26 by turning the key 26a. When the pin 27a is moved outwardly it forces the pin 27 against the spring until the pin no longer engages the wall 28. The bearing 24 is then free to turn. Movement of the pin 27a in the opposite direction allows the spring to force the pin 27 into engagement with the bearing 28 whenever the pin registers with the opening in the wall 28 in which the pins slide. The tube 13 has a closed end 29 against which cam 23 bears when it is turned.

The angle plate or lug 19 has teeth on one face to engage the teeth on face 18 and is also provided with an upturned portion 30 to engage the wheel and position the mounting axially with respect thereto. The plate 19 is secured to the member 16 by means of a screw 31 which passes through the slot 32 in plate 19. By loosening the screw 31 the plate 19 may be lifted out of engagement with the member 16 and moved in a plane parallel to the axis of the wheel with respect to the arm 11 in order to locate the arm 11 properly with respect to the wheel. When properly adjusted, the screw 31 can be tightened and will hold the parts in fixed relation.

A resilient pad 20 of rubber or like material is placed on the outer face of the plate 19 and engages the rim of the wheel when the device is in use. This pad absorbs road shocks when the device is in use and also serves another purpose to be pointed out hereinafter.

The arms 10 differ from the arm 11 in that they are not provided with the cam and sliding connection between the head A and tube 13. In the arm 10 the head A is held in permanently fixed relation to the tube 13. Otherwise arms 10 and 11 are the same.

In applying the mounting device and alarm to the wheel the arms are first extended to approximate fit by moving the tubes 13 in the tubes 12 until the appropriate holes 14 register with the holes for bolts 15. It is desirable to have the extension the same in each arm if possible so that the alarm casing 7 will be as centrally positioned as possible. The plate 19 is adjusted with respect to the member 16 to secure the best axial position for the casing 7. When applying the device to the wheel the cam 23 is turned so that it is out of contact with the end 29 of tube 13, but after the mounting has been properly adjusted and positioned in the wheel the cam 23 is turned to bear against the end 29 of the tube and thus force the head A outwardly so that the pads 20 on the arms will engage the rim of the wheel. Further turning of the cam 23 will compress the pads and when the cam is completely turned to final position the arms 10 and 11 will be forced into secure engagement with the wheel. The cam 23 is then locked in position to prevent accidental turning and also to provide protection against unauthorized removal of the mounting.

In the modified arm construction shown in Figure 7 I have provided a plurality of steps on the end of the tube 13a having curved seats 13b adapted to contact a pin 12b carried by the tube 12a. In this instance the tube 12a may be rotatably mounted in the casing 7 and when the device is applied to a wheel the tube 13a is moved in or out to effect the desired adjustment and the tube 12a rotated to suit. Since the seats 13b are curved it will be seen that when the cam 23 is adjusted to locking position the curved seats are forced tightly against the pins 12b to prevent accidental displacement.

What I claim is:

1. Means for mounting a device substantially centrally of a vehicle wheel comprising a casing for said device, a plurality of arms extending radially from the casing, at least one of said arms having relatively adjustable radially extending members, means for securing said members in adjusted position, wheel engaging means on the outer end of each of said arms, said wheel engaging means being adjustable with respect to said arms in a plane parallel to the axis of the wheel.

2. Means for mounting a device substantially centrally of a vehicle wheel comprising a casing for said device, a plurality of arms extending radially from the casing, at least one of said arms having a radially adjustable member, means for securing said member in adjusted position, wheel engaging means on the outer end of each of said arms said wheel engaging means being adjustable with respect to said arms in a plane parallel to the axis of the wheel, and means for securing said wheel engaging means in adjusted position.

3. Means for mounting a device substantially centrally of a vehicle wheel comprising a casing for said device, a plurality of radially extending arm members secured to said casing, one of said radially extending arm members comprising an inner tubular member secured to the casing, another tubular member adapted to fit and slide within said first tubular member, means for securing said tubular members in selected fixed relation and wheel engaging means on each of said arm members on the outer end thereof, said wheel engaging means including a head and a plate adapted to be secured to the head, said plate being adjustable in a plane parallel to the axis of the wheel with respect to said head.

4. Means for mounting a device substantially centrally of a vehicle wheel comprising a casing for said device, a plurality of radially extending arm members secured to said casing, one of said radially extending arm members comprising an inner tubular member secured to the casing, another tubular member adapted to fit and slide within said first tubular member, means for securing said tubular members in selected fixed relation, and wheel engaging means on each of said arm members on the outer end thereof, said wheel engaging means including a head and a plate adapted to be secured to the head, and a compressible pad on the outside of said plate.

5. Means for mounting a device substantially centrally of a vehicle wheel comprising a casing for said device, a plurality of arms extending radially from the casing, said arms being radially extensible and having wheel engaging means at the ends thereof, said wheel engaging means including a compressible pad, and means for securing said arms in approximate adjusted position to engage the wheel, one of said arms having a member which may be moved radially to force the said wheel engaging means on the arms into engagement with the wheel and compress said pads.

6. Means for mounting a device substantially centrally of a vehicle wheel comprising a casing for said device, a plurality of arms extending radially from the casing, said arms being radially extensible and having wheel engaging means at the ends thereof, said wheel engaging means including compressible pads, means for securing said arms in approximate adjusted position to engage the wheel, one of said arms having relatively radially movable members, and a cam mounted in one of said members and adapted to engage the other member whereby said radially movable member may be forced outwardly upon rotation of the cam to bring the wheel engaging means into contact with the wheel and compress said pads.

WARREN FENTON.